(12) United States Patent
Fortmann

(10) Patent No.: US 8,417,425 B2
(45) Date of Patent: Apr. 9, 2013

(54) MECHANISM FOR STABILIZING GRANULAR MATERIAL ON A VEHICLE BED

(75) Inventor: Gustavo Fortmann, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 298 days.

(21) Appl. No.: 12/966,538

(22) Filed: Dec. 13, 2010

(65) Prior Publication Data
US 2012/0150395 A1 Jun. 14, 2012

(51) Int. Cl.
*G06F 7/70* (2006.01)
(52) U.S. Cl. .................. 701/50; 298/17.5; 280/6.154
(58) Field of Classification Search ............ 701/50; 298/17.5; 280/6.154
See application file for complete search history.

(56) References Cited

U.S. PATENT DOCUMENTS

| | | | |
|---|---|---|---|
| 3,041,111 A | 6/1962 | Wyrick | |
| 6,027,173 A | 2/2000 | Bettini | |
| 6,157,889 A | 12/2000 | Baker | |
| 7,412,357 B1 | 8/2008 | Hagenbuch et al. | |
| 2008/0217874 A1 | 9/2008 | Miskin | |
| 2010/0026079 A1* | 2/2010 | Nabeshima et al. | 298/17 R |

FOREIGN PATENT DOCUMENTS

DE 7612281 9/1976

* cited by examiner

*Primary Examiner* — Thomas Black
*Assistant Examiner* — Luke Huynh
(74) *Attorney, Agent, or Firm* — Miller, Matthias & Hull

(57) ABSTRACT

An apparatus for improving the stability of a payload of granular material loaded onto the bed of a vehicle that will traverse at least one grade is disclosed. The bed of the vehicle may be coupled to a hoist mechanism which may be linked to a controller with a memory for entering a value for the grade the vehicle may traverse while carrying the payload on the bed. The controller may send a signal to the hoist mechanism to tilt the bed to a tilted position having an angle about the value of the grade. An optional tilt support mechanism may be used to engage and support the bed after the bed has been tilted by the hoist mechanism to support the bed in the tilted position while the bed is loaded with the granular material. The hoist mechanism can be used to move the bed back to the horizontal position after the payload has been deposited on the bed.

20 Claims, 4 Drawing Sheets

MECHANISM FOR STABILIZING GRANULAR MATERIAL ON A VEHICLE BED

TECHNICAL FIELD

This disclosure relates generally to a system and method for stabilizing a load of granular material on the bed of a vehicle.

BACKGROUND

Dump trucks and other machines for hauling payloads of granular material are equipped with bodies or beds that are designed to limit the material that may fall off or out of the bed during transport. The designs of these machines must take account for steep grades and, as a consequence, the use of tail-gates or tail-barriers becomes necessary. The effectiveness of a tailgate may be limited as a payload of granular material is typically loaded high on the bed and it may not be practical to design a tailgate as high as the top of the payload. Further, large tailgates are heavy, which limit the weight of the payload that the truck or machine may safely carry.

An alternative to large tailgates is a cover or tarp draped over the top of the payload. Many cover designs are available, including mechanisms that automatically deploy the cover. However, covers are only practical when the granular material is lightweight and will not tear or cut the cover. Covers are not practical for heavy dump trucks that carry material like rocks that weigh several kilograms to several hundred kilograms. Further, covers are often not preferred because of the time it takes to deploy a cover, which consumes valuable haulage time. For example, in a mining operation where a truck may be constantly hauling granular material from one location to another, the time consumed by deploying a cover each time the truck is loaded would reduce the number of loads per day the truck can haul.

Because large tailgates and covers are usually impractical for heavy dump trucks, heavy dump trucks are designed with deep beds. A deep bed can limit material spillage as long as the material is properly distributed on the bed. However, deep beds require a severe, near vertical tilt during the dumping process. A severe, near vertical tilt requires a hoist mechanism with a larger and heavier piston and, therefore, a heavier hoist mechanism. Such a heavier hoist mechanism can limit the weight of the payload the truck can safely carry. Thus, there may be a tradeoff between the depth of the bed, which enables larger payloads, and the tilt angle required to dump the payload from the bed, which may ultimately limit the weight of the payload.

The overall size of a bed presents an additional limitation. If the granular material is lightweight, the granular material may be loaded very high in an attempt to reach the maximum haulage capacity of the truck or vehicle. The higher the material is loaded, the more likely it is to spill, especially on steep grades. As a result, for lighter materials, the beds must be designed deeper and larger and, therefore heavier. Eventually a point may be reached where making the bed any larger would require a payload weight reduction.

When granular materials are poured onto a horizontal surface, such as a truck bed, a conical pile will form. The internal angle between the surface of the pile and the horizontal surface is known as the angle of repose ($\gamma$). For a conically-shaped payload disposed on a truck bed, the angle of repose is the angle between the surface of the pile and the truck bed. Materials with a low angle of repose form flatter piles than materials with a high angle of repose. The angle of repose represents the steepest slope possible relative to the truck bed, or, when the granular material on the slope face is on the verge of sliding. The angle of repose is related to the density, the surface area of the granular particles, the shapes of the particles and the coefficient of friction of the granular material.

When hauling a payload of granular material up a grade, if the granular material is loaded into a conical pile and the surface of the top of the pile is at or near the angle of repose, the angle of the grade will destabilize the payload, possibly causing spillage. Vibrations can also destabilize a conical pile of granular material. If the granular material includes sharp or large rocks, spillage can present a safety hazard to following vehicles or trucks. As truck tires are very expensive, the economics of a mining or hauling operation can also be compromised.

Therefore, there is a need for an improved system and method for loading dump truck beds and other hauling vehicle beds with granular material that maximizes the payload while minimizing spillage during both flat hauls and hauls proceeding up a grade.

SUMMARY OF THE DISCLOSURE

This disclosure describes apparatuses, vehicles, systems and methods that add stability to granular material loaded on a bed and that is hauled from one location to another and where the haul path includes traversing a grade. The disclosed apparatuses, vehicles, systems and methods reduce the likelihood of spillage of the granular material when traversing a grade.

A disclosed apparatus improves the stability of a payload of granular material loaded onto the bed of a vehicle that will traverse at least one grade while carrying the payload. The bed of the vehicle is coupled to a hoist mechanism. The apparatus may include a controller with a memory for entering a value for the grade the vehicle may traverse while carrying the payload. The controller may send a signal to the hoist mechanism to tilt the bed to a tilted position having an angle about the value of the grade. The bed, in the tilted position, may then be loaded with the granular material. The hoist mechanism may then move the bed to a horizontal position after the payload had been loaded onto the bed.

A vehicle for transporting payloads of granular material is disclosed. The vehicle may include a bed coupled to a hoist mechanism and a tilt support mechanism. The vehicle may also include an interface linked to a controller having a memory with a value of a grade the vehicle may traverse stored in the memory. The controller may send a signal to the hoist mechanism to tilt the bed an amount having an angle about the value of the grade. The bed, in the tilted position, may then be loaded with the granular material. The hoist mechanism may then move the bed to a horizontal position after the payload had been loaded onto the bed.

A method is disclosed for loading the bed of a vehicle with a payload of granular material that will traverse at least one grade. The method may include: identifying the steepest grade the vehicle will traverse; tilting the bed to an angle from a horizontal position to a tilted position having an angle about the value of the grade; supporting the bed at the angle; loading a payload onto the bed; and lowering the bed to the horizontal position thereby causing the payload to move forward on the bed.

In a refinement of any one or more embodiments disclosed herein, a tilt support mechanism may be included that is engages and supports the bed after the bed has been tilted by the hoist mechanism to support the bed in the tilted position while the bed is loaded with the granular material. The tilt support mechanism may be employed to protect the hoist mechanism from damage while the bed is loaded in the tilted position. The tilt support mechanism may then be releasable from supporting the bed so the hoist mechanism can move the bed to a horizontal position after the payload has been deposited on the bed.

In a refinement of any one or more embodiments disclosed herein, the tilt support mechanism may be moved into and out of engagement with the bed by hand.

In a refinement of any one or more embodiments disclosed herein, the tilt support mechanism may be coupled to an actuator that may be linked to the controller, and the tilt support mechanism may be moved into and out of engagement with the bed by the actuator that may receive signals from the controller.

In a refinement of any one or more embodiments disclosed herein, the controller may be part of an ECM.

In a refinement of any one or more embodiments disclosed herein, the tilt support mechanism actuator may be a hydraulic motor.

In a refinement of any one or more embodiments disclosed herein, the memory of the controller includes a plurality of angle of reposes for various granular materials.

In a refinement of any one or more embodiments disclosed herein, an interface may be included for initiating the controller sending the signal to the hoist mechanism. In a refinement of any one or more embodiments disclosed herein, the interface may be a button.

In a refinement of any one or more embodiments disclosed herein, the value for the grade may be inputted to the controller remotely.

In a refinement of any one or more embodiments disclosed herein, the angle of repose can be inputted to the controller remotely.

DETAILED DESCRIPTION

Figure 1:
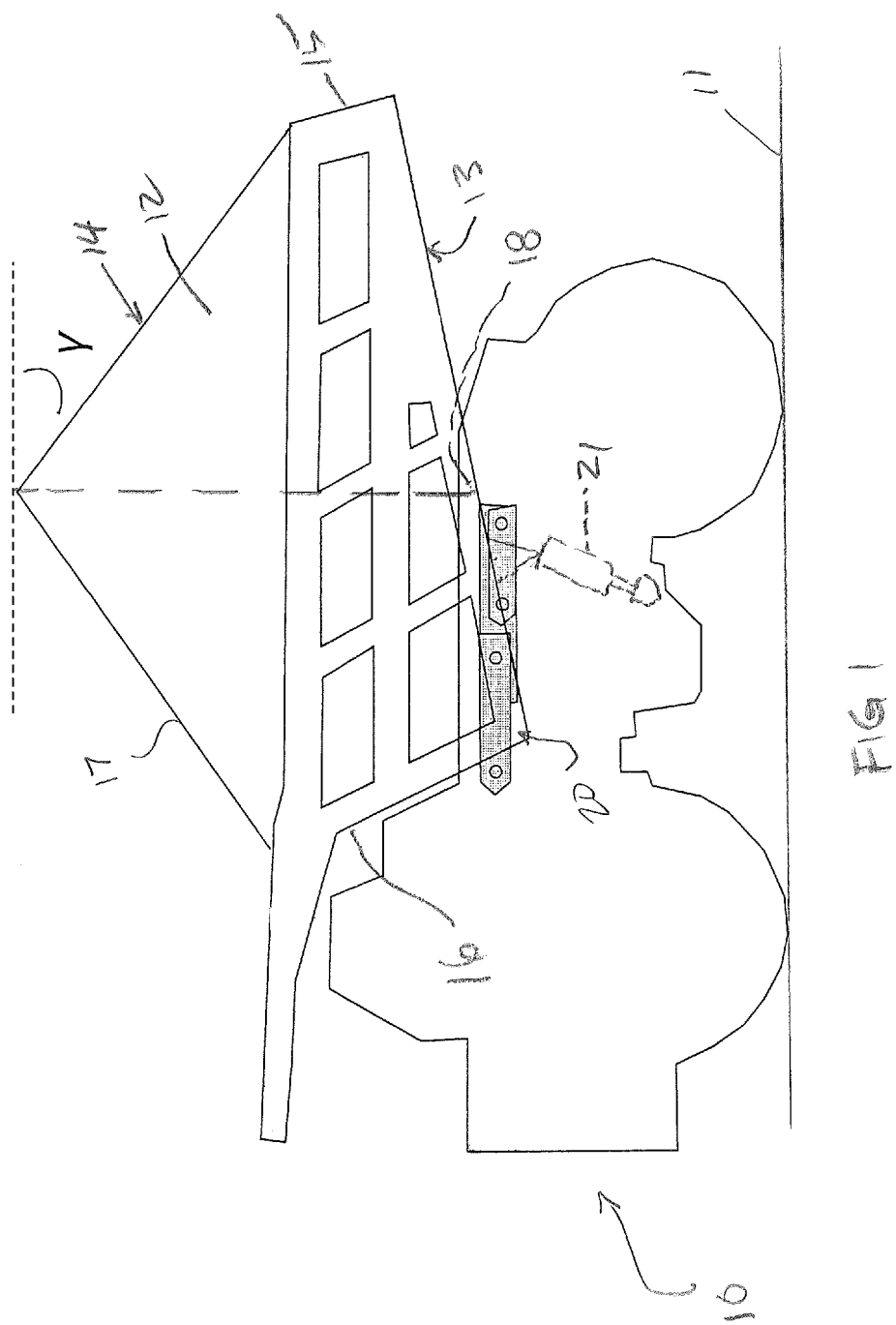
FIG. 1 is a side elevational view of a vehicle with a granular load on level ground, particularly illustrating the angle of repose $\gamma$ of the granular load.

As shown in FIG. 1, during a typical loading process, a truck 10 may be disposed on a level surface 11 and the bed 13 may be loaded close to 100% of the payload capacity of the truck 10 with a granular material 12. The bed 13 may be designed large enough to hold as much granular material 12 as the truck 10 can safely carry, but not past a threshold where increasing the size and weight of the bed 13 would reduce the amount of payload the truck 10 can safely carry. In addition to the size and weight of the bed and the haulage capacity of the truck 10, the cost of transporting the bed 13 (e.g. fuel, etc.) is usually taken into consideration when designing the bed 13 so the size of the bed 13 does not reduce the profit of carrying the payload 14.

Another factor considered in the design of the bed 13 includes a physical property of the conical pile of the granular material 12 that will be hauled on the bed 13. The physical property is known as the angle of repose $\gamma$. In FIG. 1, the granular material 12 will tend to form a conical pile having a natural static stability slope referred to as the angle of repose $\gamma$. The angle of repose $\gamma$ represents a maximum static slope of the surface 17 of the payload 14 before the surface 17 starts to slide downward. The angle of repose $\gamma$, however, usually cannot be sustained when the granular material 12 is subjected to vibrations or movement over an unlevel surface. Thus, for a heavy dump truck 10 with a fully loaded bed 13, the slope of the payload 14 should be less than the angle of repose $\gamma$. Because reducing the slope of the surface 17 results in a flatter pile, changing the slope of the payload 14 from the angle of repose $\gamma$ to a flatter dynamic stability angle that will be less than the angle of repose $\gamma$ requires that the bed 13 of the truck 10 to be larger to prevent spillage. In many situations, such as hauling rocks on a mining road, spillage can be a safety hazard not only to the truck 10 but to trucks or other vehicles following behind the truck 10.

Figure 2:
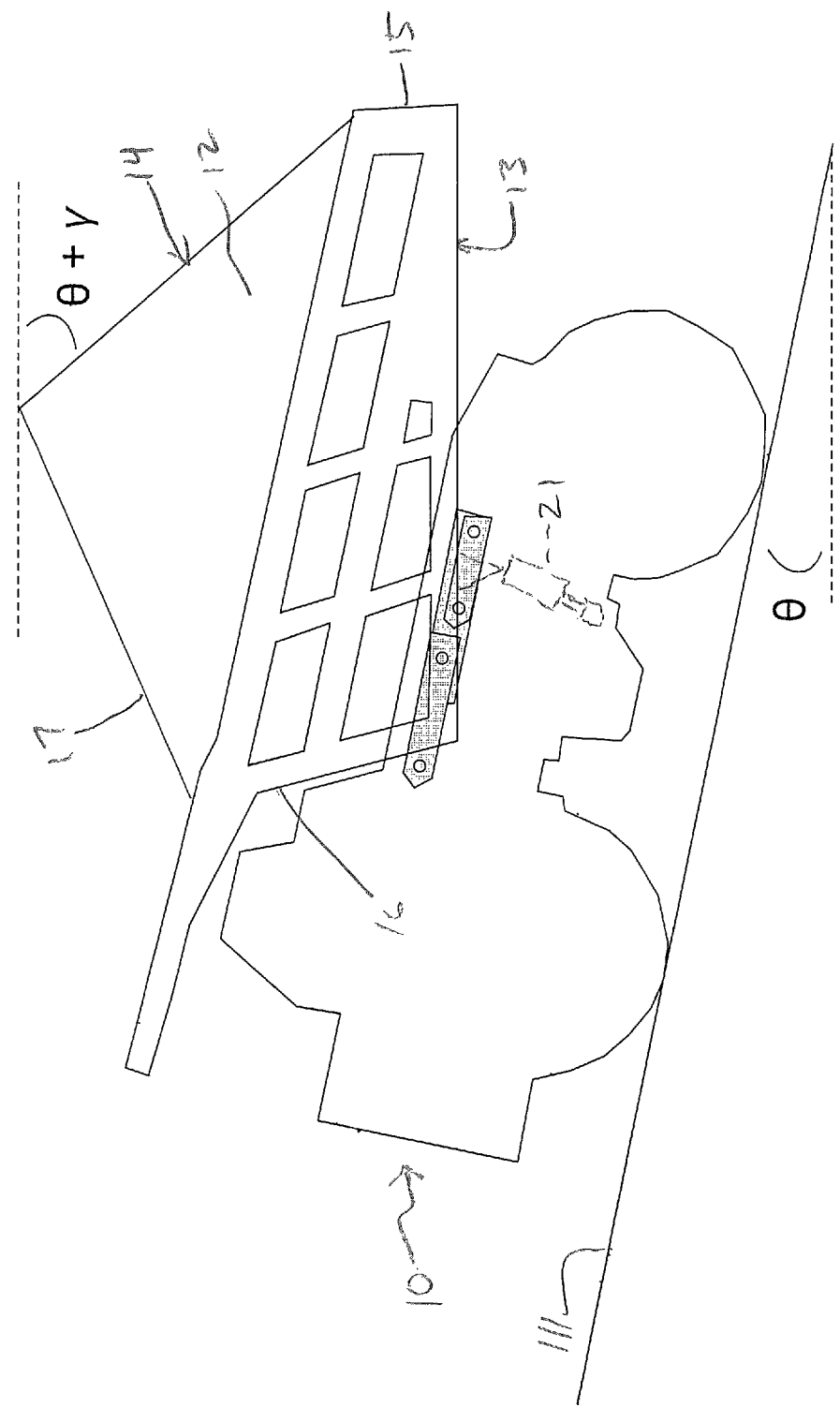
FIG. 2 is a side elevational view of the vehicle with the granular load traversing a grade.

FIG. 2 shows the load distribution of FIG. 1 on a 10° grade 111 ($\theta$=10°; 17.6% grade). As the truck 10 was loaded to capacity while on level surface 11 (FIG. 1), the slope of the grade 111 indicated by $\theta$ in FIG. 2, when combined with angle of repose $\gamma$, which was created on the level surface 11, will be beyond the dynamic stability slope for the granular material 12 as the slope of the grade $\theta$ in combination with the angle of repose $\gamma$ exceeds the angle of repose $\gamma$ ($\theta$+$\gamma$>$\gamma$). Because the angle of repose $\gamma$ represents a maximum slope available for the particular granular material 12 on level ground, not the slanted grade 111, the payload 14 as shown in FIG. 2 is unstable and the surface 17 will slide downward thereby causing spillage when truck 10 hauls the payload 14. Therefore, the bed 13 should be designed larger in order to account for both displacement of the payload 14 due to the different grades the truck 10 may traverse and vibrations.

Even with a larger bed 13, the payload 14 should be correctly placed on the bed 13, not too close to the rear 15 of the bed 13 and not too close to the front end 16 of the bed 13, or spillage may still occur. As shown in FIG. 1, the payload 14 was deposited onto the bed 13 at or about the position 18. As shown in FIG. 2, the payload 14 is loaded closer to the front end 16 of the bed 13 to limit spillage off of the rear end 15 of the bed 13 when the truck 10 is proceeding up the grade 111. As a result, the operators that load the truck 10 may take into consideration the highest grade 111 that the truck 10 needs to traverse and exercise the judgment to properly place the payload 14 on the bed 13 to limit spillage over the rear 15 of the bed 13.

Figure 3:
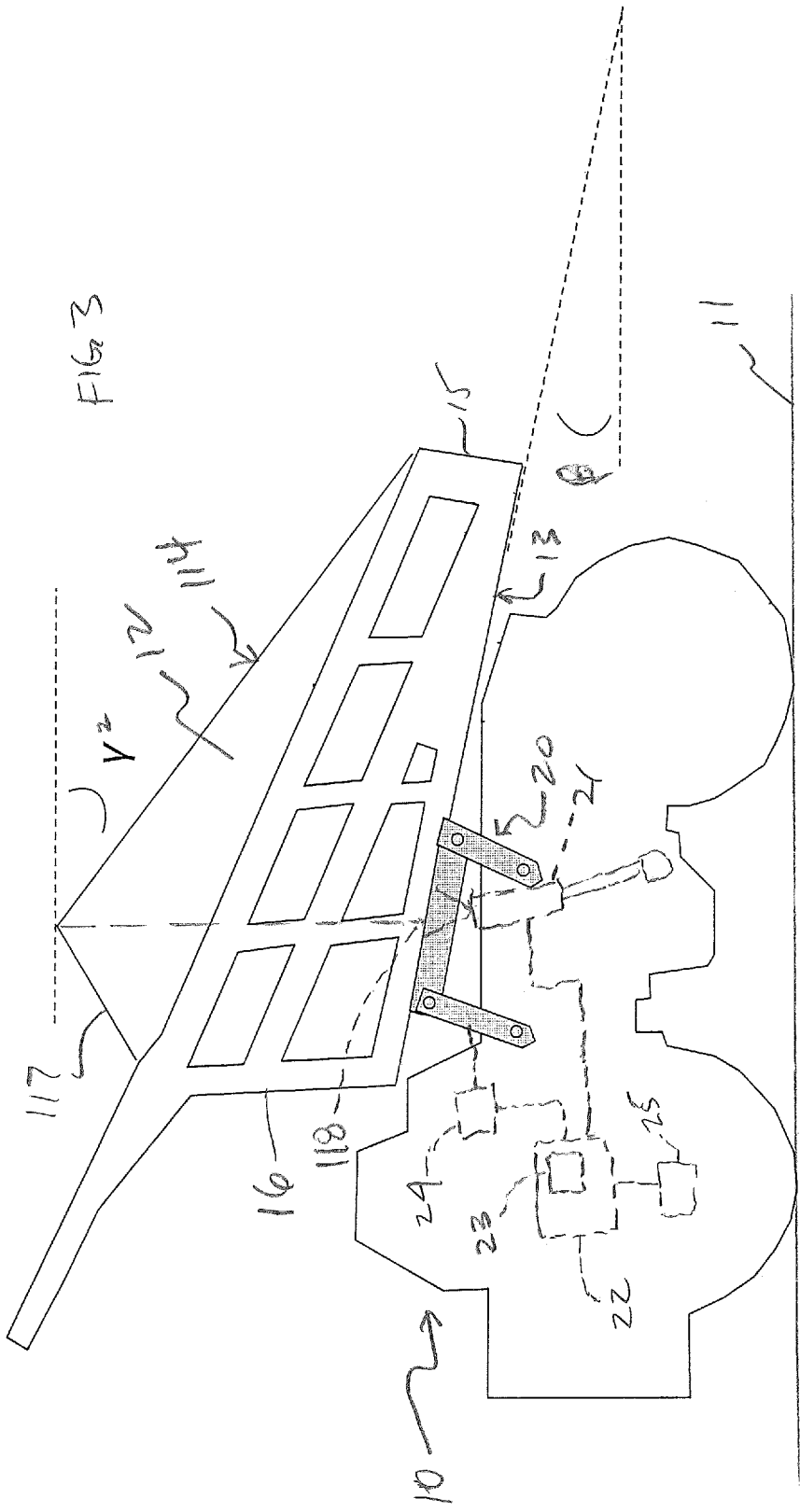
FIG. 3 is a side elevational view of the vehicle on level ground during loading of a granular load while supporting the bed of the vehicle at an angle $\beta$ that accounts for the angle of repose $\gamma$ of the granular material and the angle $\theta$ of the grade illustrated in FIG. 2.

To reduce the amount of judgment that operators must exercise, FIG. 3 illustrates a technique for loading the bed 13 while the bed 13 is in a tilted position, shown by the angle $\alpha$. In the example shown in FIG. 3, a tilt support mechanism 20 is employed to support the bed 13 at an angle $\beta$ during the loading process. The tilt support mechanism 20 may be used to support the bed 13 in the tilted position shown in FIG. 3 while the payload 114 is deposited on the bed 13. When the truck 10 has been fully loaded, the bed 13 may then lowered by the hoist mechanism 21 and haulage may commence.

However, the hoist mechanism 21 may be used to both tilt the bed 13 and support the bed 13 while the bed 13 is being loaded. Further, the bed 13 may be tilted using a mechanism other than the hoist mechanism 21 of the truck 10; a separate hoist mechanism, pulley mechanism or other type of mechanism (not shown) may be employed. In some cases, the hoist mechanism 21 may be prone to damage if the bed 13 is loaded when the hoist mechanism 21 is supporting the bed 13 in a tilted position like shown in FIG. 3. Therefore, use of the tilt support mechanism 20 may provide protection to the hoist mechanism 21 from damage caused by loading the bed 13 while the hoist mechanism 21 is supporting the bed 13 in a tilted position.

Figure 4:
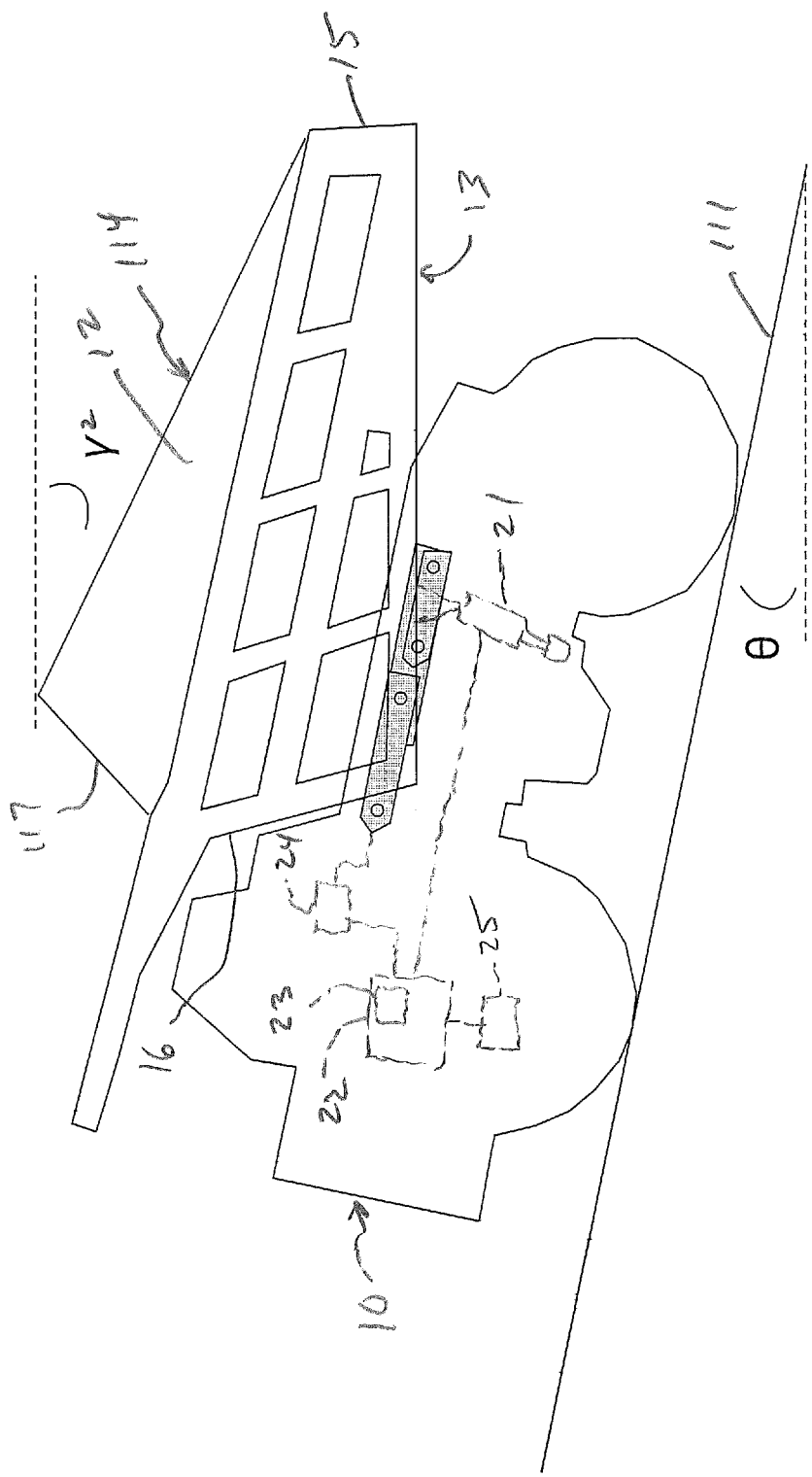
FIG. 4 is a side elevational view of the vehicle and granular load of FIG. 3 traversing the grade illustrated in FIG. 2.

As shown in FIG. 4, the introduction of β during the loading process ensures that the angle $\gamma^2$ of the slope of the granular material 12 is reduced by the angle β when the bed 13 is lowered. The flatter angle $\gamma^2$ for the slope of the surface 117 may be controlled by controlling β during the loading process so the conical pile of granular material 12 may remain stable for the steepest grade in the haul path, even when subjected to vibrations. The introduction of the load angle β may reduce the possibility of spillage because it may result in a flatter slope for the surface 117.

Another benefit shown in FIG. 3 that will reduce the possibility of spillage is allowing the payload 114 to shift forward on the bed 13 to a position 118 that is closer to the front end 16 of the bed 13 than the position 18 illustrated in FIG. 1. By allowing the load position 118 to move forward when the bed 13 is lowered, the risk of spillage off the rear end 15 of the bed 13 while traversing up a steep grade 111 may be reduced. Further, the bed 13 may be designed as such that when the bed 13 reaches close to 100% weight capacity, the granular material 12 will spill from the rear 15 of the bed 13. Using one or more of these techniques, accidental overloading of the bed 13 becomes less likely with the increased stability of the surface 117. The loading process illustrated in FIG. 3 may also lead to improved designs for the bed 13 with an improved approach to the economically ideal bed size, making each haul cycle more profitable. Because spilled rocks of certain sizes are typical causes for damage to truck tires, a reduction of spillage provides both safety and economic benefits the haulage process. Another possible technique shown in FIG. 3 that will reduce the possibility of spillage is to deposit the payload 114 on the bed 13 at a position 118 that is closer to the front end 16 of the bed 13 than the position 18 illustrated in FIG. 1. By moving the load position 118 forward, the risk of spillage off the rear end 15 of the bed 13 while traversing up a steep grade 111 may be reduced.

A fixed loading angle may not fit all types of payloads, so it may be preferable to introduce an adjustable loading angle β. Such an adjustable angle β would be used for variations in the grade angle θ of the haulage paths from one location to another, for variations in the angle of repose γ of various materials and by limiting the loading capabilities of the bed 13 before the granular material 12 begins to fall off the rear end 15 of the bed 13.

The hoist mechanism 21 may be controlled and activated by a controller 22 which may be a separate or dedicated controller or part of the engine control module (ECM) of the truck 10. The controller 22 may include a memory 23 for the storage of the angle of repose γ of the granular material 12 being transported or various angles of repose γ for various granular materials that the truck 10 is expected to transport. The tilt support mechanism 20 may be moved into an out of a position supporting the bed 13 by an actuator 24 which, in turn, may be activated and controlled by the controller 22. A value for the grade, such as the angle θ or various grade angles or various values for the grade such as the commonly used degree or percentage of the grade (tan(θ)) may also be stored in the memory 23 of the controller 22.

The controller 22 may include a wireless connection so that the angle of repose γ may be inputted to the controller 22 and into the memory 23 remotely. For that matter, the grade angle θ and/or modified angle of repose $\gamma^2$ may be inputted remotely as well. An interface 25 may be provided on the truck 10 for inputting the grade angle θ, the angle of repose γ, the modified angle of repose $\gamma^2$ or any combination thereof. As an alternative, the memory 23 of the controller 22 may be programmed remotely or the grade angle θ, the angle of repose γ, the modified angle of repose $\gamma^2$ or any combination thereof may be stored in the memory 23 ahead of time and the interface 25 on the truck 10 may be a simplified pushbutton device.

INDUSTRIAL APPLICABILITY

In an ideal bed design, the load will spill once 100% of the capacity is reached. In practice, however, an ideal bed design may not be practical as the density of the granular material may vary, rainwater may affect the physical characteristics of the payload, the severity of vibrations may vary and/or grades the truck will traverse can vary. Use of the hoist mechanism to tilt the bed prior to loading, the optional implementation of the disclosed tilt support mechanism and the disclosed loading methods greatly reduce the need for extending the size of the bed in order to reduce spillage. By avoiding beds that are larger and therefore heavier than necessary, the economics of the hauling process are improved.

To safely load a bed with granular material that will be exposed to vibrations and an unlevel haul path, the steepest grade in the haul path is identified. The bed may then be tilted to an angle from horizontal to a tilted position having an angle about the value of the grade. The bed may then be supported at the angle by the hoist mechanism, a tilt support mechanism or other mechanism because many truck bed hoist systems can be damaged if the bed is loaded in a tilted position. A payload of granular material may then be loaded onto the bed. The bed may then be lowered to the horizontal position which may cause the load to shift forward on the bed.

The disclosed apparatuses, systems, trucks and methods simplify the loading of granular materials onto a truck or vehicle bed that will traverse one or more grades along the haul path. By simplifying the loading process, and reducing the guesswork associated with loading a payload of granular materials onto a truck or vehicle bed, safety is enhanced because the likelihood of spillage is reduced. By reducing the likelihood of spillage, the economics of the hauling operation are enhanced.

The invention claimed is:

1. An apparatus for improving the stability of a payload of granular material loaded onto a bed of a vehicle that will traverse at least one grade while carrying the payload, the apparatus comprising:
    a controller with a memory for entering a value for the grade the vehicle is expected to traverse while carrying the payload on the bed,
    the controller being linked to a hoist mechanism, the hoist mechanism being coupled to the bed for raising the bed from a horizontal position to a tilted position having an angle about the value of the grade,
    the controller sending a signal to the hoist mechanism to tilt the bed from the horizontal position to the tilted position,
    the controller sending a signal to the hoist mechanism to move the bed from the tilted position back to the horizontal position after the bed is loaded with the payload of granular material.

2. The apparatus of claim 1 further including a tilt support mechanism movable to engage the bed after the bed has been tilted by the hoist mechanism to support the bed in the tilted position,
    the tilt support mechanism being releasable from supporting the bed so the hoist mechanism can move the bed back to the horizontal position.

3. The apparatus of claim 2 wherein the tilt support mechanism is coupled to an actuator that is linked to the controller, and wherein the tilt support mechanism is moved into and out of engagement with the bed by the actuator that receives signals from the controller.

4. The apparatus of claim 1 wherein the memory of the controller also includes an angle of repose of the granular material stored therein, the controller being programmed to combine the angle of repose and the value for the grade to generate a modified angle of repose.

5. The apparatus of claim 4 wherein a position of the granular material on the bed shifts forward when the bed is lowered back to a horizontal position thereby limiting granular material from falling off a rear end of the bed while traversing the grade.

6. The apparatus of claim 1 wherein the controller is part of an ECM.

7. The apparatus of claim 3 wherein the actuator is a hydraulic motor.

8. The apparatus of claim 4 wherein the memory of the controller has a plurality of angle of reposes for various granular materials stored therein.

9. The apparatus of claim 1 further comprising an interface for initiating the controller sending the signal to the hoist mechanism, the interface including a button.

10. The apparatus of claim 1 wherein the value for the grade can be inputted to the controller remotely.

11. The apparatus of claim 4 wherein the angle of repose can be inputted to the controller remotely.

12. A vehicle for transporting granular payloads, the vehicle comprising:
    an interface linked to a controller,
    the controller having a memory with a value of a grade the vehicle is expected to traverse stored therein,
    the controller being linked to a hoist mechanism, the hoist mechanism being coupled to the bed,
    the controller sending a signal to the hoist mechanism to tilt the bed from the horizontal position to a tilted position having an angle about the value of the grade,
    the controller sending a signal to the hoist mechanism to move the bed from the tilted position back to the horizontal position after the bed is loaded with the payload of granular material.

13. The vehicle of claim 12 further including a tilt support mechanism movable to engage the bed after the bed has been tilted by the hoist mechanism to support the bed in the tilted position,
    the tilt support mechanism being releasable from supporting the bed so the hoist mechanism can move the bed back to the horizontal position.

14. The vehicle of claim 13 wherein the tilt support mechanism is coupled to an actuator that is linked to the controller, and wherein the tilt support mechanism is moved into and out of engagement with the bed by the actuator that receives signals from the controller.

15. The vehicle of claim 12 wherein the memory of the controller also includes the angle of repose of the granular material stored therein, the controller being programmed to combine the angle of repose and the value for the grade to generate a modified angle of repose.

16. The vehicle of claim 15 wherein a position of the granular material on the bed shifts forward when the bed is lowered back to a horizontal position thereby limiting granular material from falling off a rear end of the bed while traversing the grade.

17. The vehicle of claim 12 wherein the controller is part of an ECM.

18. The vehicle of claim 14 wherein the memory of the controller has a plurality of angle of reposes stored therein for various granular materials and various granular materials with various water contents.

19. A method for loading the bed of a vehicle with a payload of granular material that will traverse at least one grade, the bed having a front end and a rear end, the method comprising:
    identifying the steepest grade the vehicle will traverse,
    tilting the bed to an angle from a horizontal position to a tilted position having an angle about the value of the grade,
    supporting the bed at the angle,
    dumping a payload on the bed,
    lowering the bed to the horizontal position.

20. The method of claim 19 wherein the bed is supported at the angle during the dumping of the payload on the bed by a tilt support mechanism.

* * * * *

UNITED STATES PATENT AND TRADEMARK OFFICE
CERTIFICATE OF CORRECTION

| | | |
|---|---|---|
| PATENT NO. | : 8,417,425 B2 | Page 1 of 1 |
| APPLICATION NO. | : 12/966538 | |
| DATED | : April 9, 2013 | |
| INVENTOR(S) | : Gustavo Fortmann | |

It is certified that error appears in the above-identified patent and that said Letters Patent is hereby corrected as shown below:

In the Specification

Column 4, line 50, delete "angle α." and insert -- angle β. --.

Signed and Sealed this
Twenty-fifth Day of August, 2015

Michelle K. Lee
*Director of the United States Patent and Trademark Office*